United States Patent
La Fiandra

[11] Patent Number: 6,137,622
[45] Date of Patent: Oct. 24, 2000

[54] KINEMATIC ACTUATOR DEFORMABLE MIRROR

[75] Inventor: Carlo La Fiandra, Danbury, Conn.

[73] Assignee: Raytheon Company, Lexington, Mass.

[21] Appl. No.: 09/343,953

[22] Filed: Jun. 30, 1999

[51] Int. Cl.[7] .................................. G02B 26/00
[52] U.S. Cl. .................. 359/290; 359/221; 359/223; 359/224; 29/898.07
[58] Field of Search .................... 359/290, 291, 359/298, 223, 224, 230, 221, 213, 214; 29/898.07

[56] References Cited

U.S. PATENT DOCUMENTS

| | | | |
|---|---|---|---|
| 3,544,202 | 12/1970 | Fowler | 359/224 |
| 4,129,930 | 12/1978 | Dragt | 359/221 |
| 4,660,941 | 4/1987 | Hattori et al. | 359/224 |
| 4,705,365 | 11/1987 | Wakita et al. | 359/224 |
| 4,917,484 | 4/1990 | Hainz | 359/224 |
| 5,535,043 | 7/1996 | La Fiandra et al. | 359/224 |
| 5,917,644 | 6/1999 | La Fiandra | 359/290 |
| 5,940,203 | 8/1999 | La Fiandra | 359/290 |
| 6,011,639 | 1/2000 | La Fiandra | 359/224 |

*Primary Examiner*—Loha Ben
*Attorney, Agent, or Firm*—William C. Schubert; Glenn H. Lenzen, Jr.

[57] ABSTRACT

An assembly comprises a support having at least one opening therein and an optical substrate having a light reflective first surface and an opposite back surface. At least one actuator assembly is provided and is located within the at least one opening and is connected to the back surface of the optical substrate and the support. The at least one actuator assembly having a portion with a diameter slightly smaller than the inner diameter of the at least one opening to form a gap therebetween. An internal passage is formed in the portion of the at least one actuator assembly and communicates with an external surface thereof. An adhesive pinning is formed in the gap between the inner surface of the at least one opening and the juxtaposed portion of the at least one actuator and is formed by injecting adhesive into the gap through the passage.

10 Claims, 2 Drawing Sheets

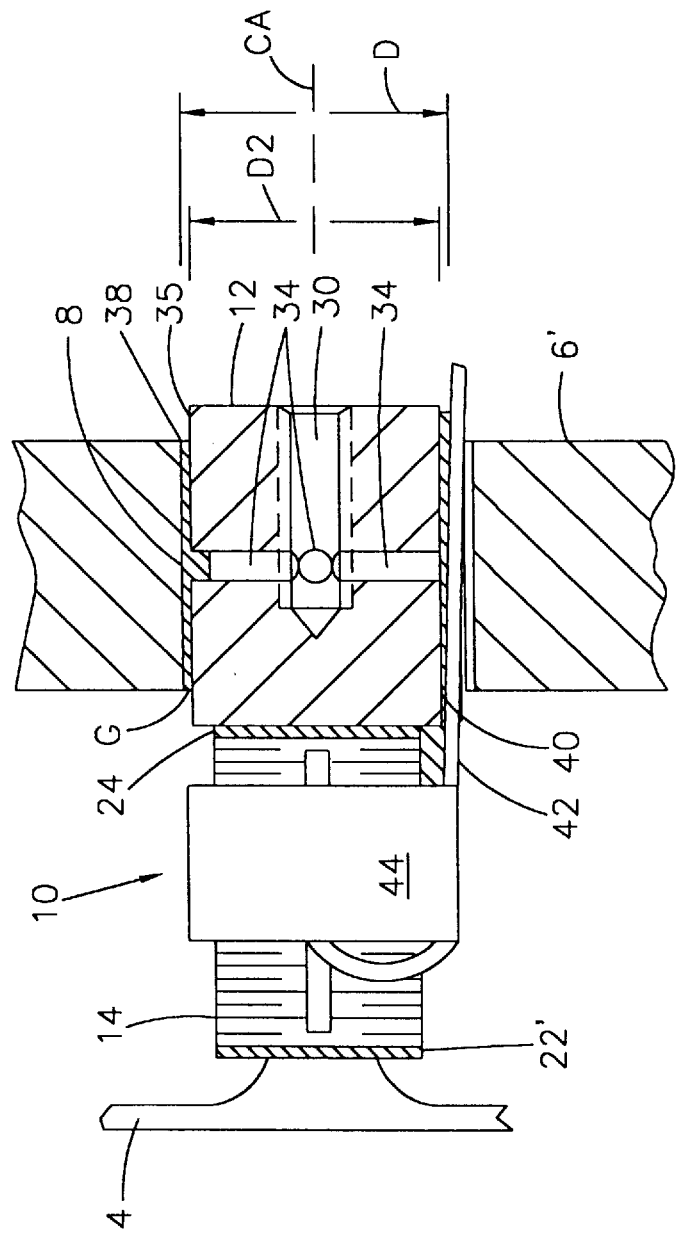
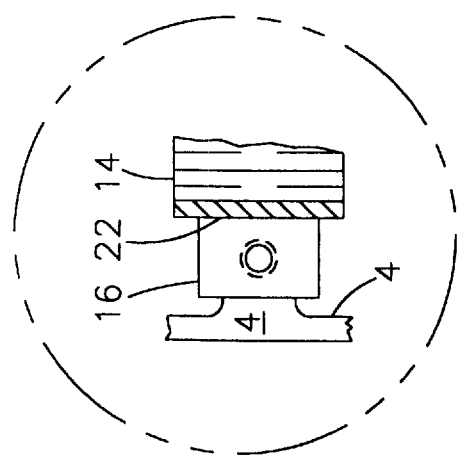
FIG. 2A
FIG. 2B

KINEMATIC ACTUATOR DEFORMABLE MIRROR

CROSS REFERENCE TO RELATED APPLICATIONS

This application relates to U.S. application Ser. No. 08/293,787, entitled REPLACEMENT ACTUATOR ASSEMBLY FOR OPTICAL MIRROR WITH KINEMATIC MOUNT, now U.S. Pat. No. 5,535,043; 08/965,440, entitled ONE PIECE DEFORMABLE MIRROR ACTUATOR ASSEMBLY, now U.S. Pat. No. 6,011,639; 08/992,022, entitled HIGH ACTUATOR DENSITY DEFORMABLE MIRROR; 08/982,920, entitled HIGH-ENERGY-BURST DEFORMABLE MIRROR, now U.S. Pat. No. 5,940,203; 09/071,510, entitled INTEGRAL HIGH-ENERGY-BUTTON DEFORMABLE MIRROR, now U.S. Pat. No. 5,917,644; U.S. Pat. No. 5,745,278 entitled INNOVATIVE DEFORMABLE MIRROR ACTUATOR CONFIGURATION; and U.S. application Ser. No. 09/326,761, entitled DEFORMABLE MIRROR WITH REMOVABLE ACTUATOR USING SHAPED-MEMORY ALLOYS.

FIELD OF THE INVENTION

This invention relates to deformable mirrors that are used in atmospheric correction systems as well as high and low energy laser beam train lines.

BACKGROUND OF THE INVENTION

The device of the invention involves the configuring of a deformable mirror such that it permits easy actuator replacement. This characteristic makes the invention applicable to high spatial frequency deformable mirrors such as are currently used in atmospheric correcting system (SAAO) and airborne laser weapon programs where the actuators are 7 mm apart. Furthermore, the invention enables the manufacturing of a deformable mirror to be more easily accomplished, so as to end up with controlled, robust joints on both sides of the actuator, and permits significantly less problems in actuator replacement from the completed unit.

The purpose of the invention is to overcome the short comings in the design of present deformable mirrors. The current state of the art suffers from actuator joints that separate because of poor bonds, and in addition, actuators are very difficult to replace, necessitating removal of the entire faceplate. This invention offers a more reliable joint, both in assembly and use, as well as the capability of replacing individual actuators without removing the entire face plate.

As discussed in U.S. Pat. No. 5,745,278, deformable mirrors primarily intended for use as a beam train optic, require frequency response, reliability, and low cost of manufacture as critical to the design, performance and usefulness. Thus the invention has particular usefulness in deformable mirrors that are used in adaptive optical systems. This would include low and high energy beam train configurations; that is, both in atmospheric correcting systems (SAAO) as well as laser weapon systems.

A deformable mirror which is used as a downstream optic in conjunction with a substantially larger optical system which is disposed upstream thereof must possess a high degree of sensitivity with respect to its ability to make highly minute adjustments to the reflective surface of the mirror. This is because such optical downstream mirrors represent the upstream optics in miniature. Such mirrors have a diameter in the range of five to fifteen inches, but for the larger sizes use on the order of about one thousand separate piezoelectric actuators to effect such adjustments is possible. As can be expected, the nearly one thousand piezoelectric actuators which are used, are highly miniaturized and make assembly and disassembly when necessary, of the approximately one thousand piezoelectric actuators with the deformable mirror, painstakingly tedious.

Current state-of-the art deformable mirrors, such as, SAAOs must be satisfied with degraded performance if any of their 941 actuators fail since they are very difficult to replace. This replacement includes a complete replacement of the optical faceplate, a very difficult process. It is known to mechanically decouple the nose of the actuator from the back of the face plate, such as by cutting it with a wire saw. Other techniques involve melting epoxy joints with the application of heat to remove actuators.

Thus an object of the invention is to permit easy replacement of actuators in deformable mirrors thus maintaining their required performance characteristics without degradation with reasonable cost and schedule impacts.

Accordingly, it is another object of the present invention to provide deformable mirror actuation using individual piezoelectric actuators connected via an epoxy bond to the reaction plate thereby permitting disassembly inherent in systems utilizing such actuators.

Yet still a further object of the invention is to provide a means of in situ actuator replacement.

BRIEF DESCRIPTION OF THE DRAWINGS

FIG. 2A is a partially fragmentary view of an actuator stem connected to a mirror.

FIG. 2B is an exploded view of an alternate embodiment of the actuator stem connected to a mirror using a metal block.

SUMMARY OF THE INVENTION

The invention resides in an assembly comprised of a support having at least one opening therein and an optical substrate having a light reflective first surface and an opposite back surface. At least one actuator assembly is provided and is located within the at least one opening and is connected to the back surface of the optical substrate and the support. The at least one actuator assembly has a portion with a diameter slightly smaller than the inner diameter of the at least one opening to form a gap therebetween. An internal passage is formed in the portion of the at least one actuator assembly and communicates with an external surface thereof. An adhesive pinning is formed in the gap between the inner surface of the at least one opening and the juxtaposed portion of the at least one actuator and is formed by injecting adhesive into the gap through the passage.

DETAILED DESCRIPTION OF THE PREFERRED EMBODIMENT

Figure 1B:
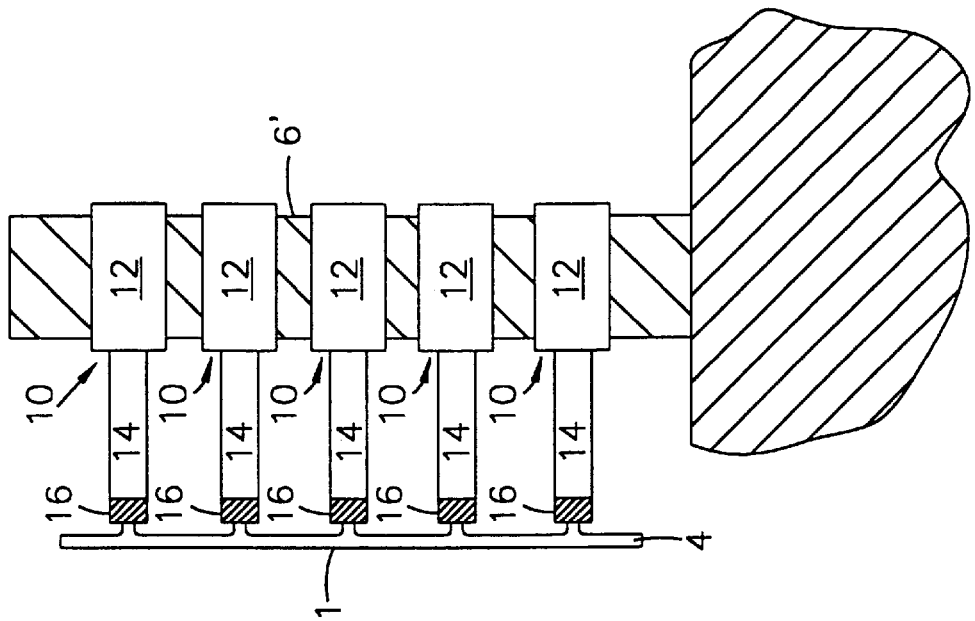
FIG. 1B is a partially fragmentary schematic side view of the front end of an actuator and mirror connection of the invention.
Figure 1A:
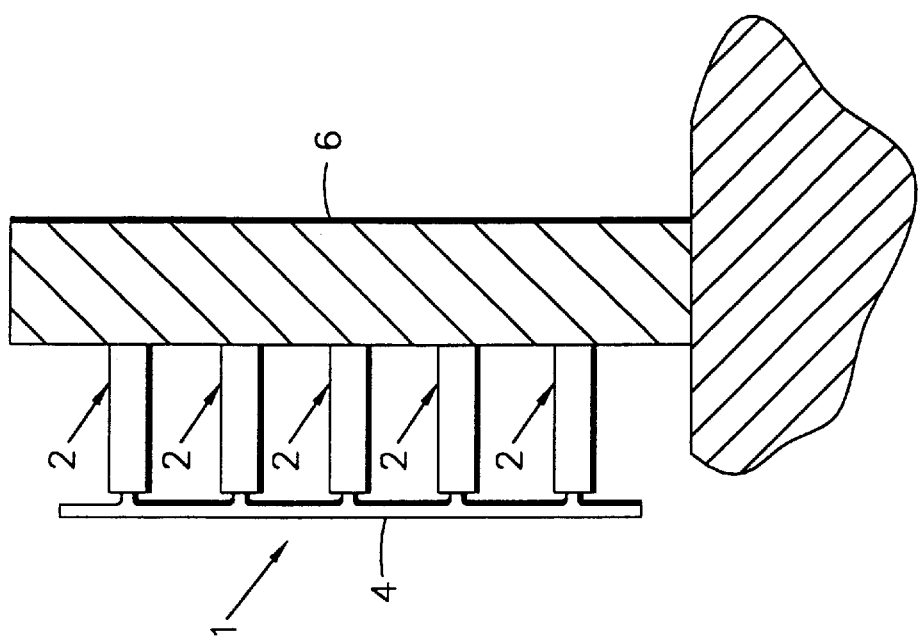
FIG. 1A is a partially fragmentary schematic side view of the front end of a prior art actuator and mirror connection.

The prior art is shown schematically in FIG. 1A, wherein actuators 2,2 are epoxy bonded on both ends so as to be sandwiched between a face plate 4 and a reaction plate 6 of a deformable mirror 1. This prior art approach was to bond all of the actuators to the reaction plate and then finish off all of the free ends so as to be coplanar with each other. The back of the face plate which is directed at the actuators is also made coplanar at the interface surface. However, even with the greatest care, it is almost impossible to make a joint where all of the involved gaps are identical (this is desirable because differential strains caused by humidity effects from different thickness bond line dimensions will effect the configuration of the mirror). Thus, the first three high points at the joint interface will touch, and all others will have a different gap. Still problematic with this conventional design, is that it captures all of the actuators between the faceplate and the reaction plate, requiring removal of either of the entire faceplate or the reaction plate for actuator replacement.

Referring now to the invention shown in FIGS. 1B, 2A and 2B, it should be seen that FIG. 1B illustrates the difference between the present invention and the conventional state of the art shown in FIG. 1A. As seen in FIG. 1B, the reaction plate 6', rather than being a solid structure, is provided instead with machined through openings 8,8 into which are received a plurality of actuator assemblies 10,10. As will become apparent later, each actuator is in reality made up of a subassembly of components such that each subassembly is inserted through the reaction plate, from the right to the left in the FIG. 1B.

As seen in FIGS. 1B, 2A and 2B, and to the actuator assembly construction, it should be seen that each actuator 10 is a subassembly comprised of a metal cylinder making up the body portion 12 of the actuator, an actuator portion 14, and optionally (see FIG. 2B) another metal cylinder 16 connected between the faceplate and the actuator. If the other metal cylinder 16 is not used, then as seen in FIG. 2A, the faceplate 4 can be bonded directly to the moving end of the actuator 14. However, if the other metal cylinder 16 is used, then it should be understood that the diameter D1 of the other cylinder 16 is less than that of the diameter D2 of the body cylinder 12. Also, the actuator portion 14 is preferably formed as a 6.4 mm×6.4 mm square cross section actuator.

Prior to insertion, each actuator assembly 10 is manufactured such that the nose of the other metal cylinder 16 is coated with adhesive 22,22' to bond the subassembly 10 to the back of the faceplate. The metal cylinder 12 is also connected to one end of the actuator 14 by an adhesive bond 24. This arrangement serves to help disassembly of a particular actuator. That is, heat can be applied, and when the bonded joint reaches about 500 degrees F., it can be separated. Thus, parts of the actuator can be separated from one another depending upon the required task(s) at hand, including removal from the faceplate 4.

As seen in FIG. 2A, each actuator 10 is received within one of a plurality of circular openings 8 of an inner diameter D formed in the reaction plate. Each actuator 10 is defined by an actuator body 12 in the form of a cylindrical block having an outer diameter D2. As seen in FIG. 2A, each opening defined by the diameter D is somewhat larger in size than that of the outer diameter D2 of the actuator body 12 so as to provide an annular gap G thereabout.

In addition, each actuator body 12 has an axially disposed blind opening 30 formed through it extending concentrically with the central axis CA of each actuator. Communicating with the axial blind opening 30 are a plurality of radially extending openings 34,34 which open to the outer surface 35 of the cylinder 12. The openings 34,34 can be formed from two cross drilled bores. Each actuator assembly is thus secured to the reaction plate 6' by injecting epoxy into the opening 30 and then through the radial openings 34 to fill the gap G between the inner surface of the openings 8 and the outer surface 35 of the cylinder 12. An epoxy pinning 38 is thus provided between the actuator 10 and the internal confine of the opening 8 to ensure a moment (stress and strain) free connection. The use of the available volume must be maximized because of the close spacing of the actuators.

The internal injection of adhesive through the axial blind opening 30 insures that the radial gap G is properly filled with epoxy. Since the hole 8 in the reaction plate does not constrain the subassembly in the axial direction, the problem of over constraint inherent in the conventional design does not exist. This prevents distorting of the thin mirror faceplate. This also means that the joint at the actuator end can be carefully controlled with each individual actuator. That is, it is easy to control the radial gap between the outside diameter of the larger cylinder 12 and the inside diameter D of the hole 8, thus also ensuring optimum bonding gap dimensions there.

It should also be noted that this present actuator structure eliminates the need for complicated assembly fixtures that have to reference onto the outside dimensions of the actuator that are not that precise to begin with. Rather, this arrangement references to the outer diameter D2 of the larger metal cylinder 12. In effect, this construction is self-fixturing, and the accuracy of locating the relative components is machined into the parts themselves. Again, the pinning 38 can be undone such that heat can be applied, and when the bonded joint reaches about 500 degrees F., it can be separated. One possible way of applying such heat is with a laser shined on the front face of the faceplate. Thus, an entire actuator can be removed through the reaction plate, the bonding surfaces cleaned, and a new subassembly installed into the unit.

Each actuator body 12 further includes axially extending slots 40 which communicate with the outer diameter of the cylindrical body 12 and is correspondingly sized and shaped to receive wire leads 42 which pass through the reaction plate 6' in this manner to connect to the actuator. Also, a strain relief band 44 may be provided as part of the actuator 10.

Accordingly, the invention has been described by way of illustration rather than limitation. Thus, the invention applies to all deformable mirror applications using thin deformable mirrors, such as, found in the ABL program and astronomical atmospheric correction programs and can be applied commercially anywhere there is a need for low cost, easily assembled and removable actuator arrays.

I claim:

1. An assembly comprising:

a support having at least one opening therein;

an optical substrate having a light reflective first surface and an opposite back surface;

at least one actuator assembly located within said at least one opening and connected to said back surface of said optical substrate and to said support;

said at least one actuator assembly having a portion juxtaposed within said at least one opening with a diameter slightly smaller than the inner diameter of said at least one opening to form a gap therebetween;

an internal passage formed in said juxtaposed portion of said at least one actuator assembly and communicating with an external surface thereof; and an adhesive pinning formed in said gap and created by injecting adhesive into said gap through said passage.

2. An assembly as defined in claim 1 further characterized in that said actuator assembly is comprised of an axially oriented actuator portion and said juxtaposed portion is a cylindrical metal body portion connected together by an adhesive joint.

3. An assembly as defined in claim 2 further characterized by an epoxy joint connecting said actuator portion directly to said back surface of said optical substrate.

4. An assembly as defined in claim 2 further characterized in that said actuator assembly includes another metal portion which is interposed between the actuator portion and said back surface of said optical substrate and connected together by an epoxy bond.

5. An assembly as defined in claim 4 further characterized in that said actuator portion is defined by a square cross section.

6. An assembly as defined in claim 5 further characterized in that said actuator portion has a dimension of 6.4 mm×6.4 mm.

7. An assembly as defined in claim 1 further characterized in that said internal passage formed in said portion of said at least one actuator assembly being defined by an axially extending blind opening communicating with at least one radially extending opening communicating with said external surface.

8. An assembly as defined in claim 7 further characterized in that said epoxy bond can be undone by applying heat at about 500 degrees F.

9. An assembly as defined in claim 7 further characterized in that said portion of said at least one actuator assembly with a diameter slightly smaller than the inner diameter of said at least one opening has an axial slot therein.

10. An assembly as defined in claim 9 further characterized in that said at least one radially extending opening is formed by cross drilling with said axially extending blind opening.

* * * * *